June 22, 1937.  W. MECKLENBURG ET AL  2,084,651
PREPARATION OF HYPOSULFITES
Filed May 2, 1934
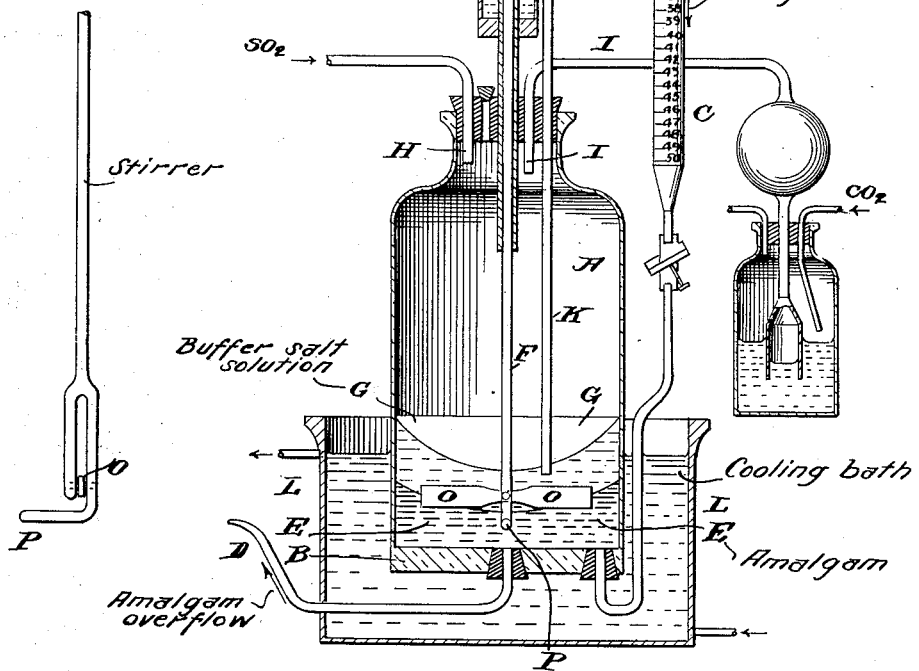
Inventor:
Werner Mecklenburg and
Alfred Wurbs
Sol Shapiro
their Att'y.

Patented June 22, 1937

2,084,651

UNITED STATES PATENT OFFICE 2,084,651

PREPARATION OF HYPOSULFITES

Werner Mecklenburg, Neuenkirchen auf Rugen, Pommern, Germany, and Alfred Wurbs, Bokau, Czechoslovakia Application May 2, 1934, Serial No. 723,554. In Germany March 26, 1931

10 Claims. (Cl. 23—116)

This invention relates to methods of producing hyposulfites, and particularly to such methods carried out in aqueous solutions, while still obtaining substantial yields.

It was heretofore known that metallic sodium and sulphur dioxide could be combined to form sodium hyposulfite in accordance with the equation:

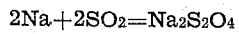

$$2Na + 2SO_2 = Na_2S_2O_4$$

In carrying out that reaction, however, it was necessary to operate in organic solutions or diluents, which did not react with the sodium, and while completely excluding the presence of water. Under such operating conditions, the hyposulfite was obtained in a fine grained, easily decomposable form, which material remained practically useless, even in the process described in German Patent No. 148,125. In this connection, that German patent referring to operating in aqueous media stated that "a direct production of sodium hydrosulfite from sodium with aqueous sulphur dioxide is obviously quite impossible".

Among the objects of the present invention is the production of hyposulfites by reaction of sodium with sulphur dioxide in aqueous media while obtaining high yields.

Other and further objects and advantages will appear from the more detailed description set forth below, it being understood, however, that this more detailed description is given by way of illustration and explanation only, and not by way of limitation, since various changes therein may be made to those skilled in the art without departing from the scope and spirit of the present invention.

In connection with this more detailed description, there is shown in the drawing in Figure 1, a schematic arrangement of apparatus for carrying out the present invention; and in Figure 2, a detail of the stirrer shown in Figure 1.

In accordance with the present invention, it has been found, for example, that the direct combination of sodium with sulphur dioxide can be easily carried out in aqueous media if the hydrogen ion concentration of such aqueous media are controlled, and particularly when such reactions are carried out in aqueous solutions maintained at a hydrogen ion concentration of between about pH=6 and pH=7, as by the addition of suitable soluble salts, and the regulation of the quantity of sulphur dioxide introduced, that the acidity of the solution during the entire process is maintained within the limits of acidity given above.

As such addition materials for controlling the acidity of the solution, there may be mentioned the acid salts of weak or moderately strong inorganic and organic acids, as for example the alkali metal phosphates, the alkali metal borates, the alkali metal sulfites, the alkali metal maleinates, etc. It has been found that in these reactions, the nature of these addition substances is not per se important, since the same results are obtained by the use of such chemically different addition materials as acid potassium phosphate on the one hand, or sodium bisulfite on the other.

Desirably the acidity of the solution is adjusted not merely by the use of the acid salts of the chosen acid, but by an admixture of the acid salts, together with neutral salts, since by the such mixtures fluctuations of the acidity during the process is best controlled. In general, while the addition of between 1 to 5% of the acid salts serve satisfactorily to buffer the reaction mixture, the addition thereto of an equal amount of the neutral salt may desirably be made. As a result, one may start the reaction mixture with a neutral salt only, and produce the desired ratio between neutral salt and acid salt, and consequently the desired acidity of the solution, in the solution itself by the introduction of the sulphur dioxide.

The present invention particularly differentiates from the prior art processes for the production of sodium hyposulfites by means of sodium in aqueous medium, since the present invention maintains a particular range of acidity during the entire reaction. In the prior art processes, the entire amount of sulphur dioxide utilized for the production of the sodium hyposulfite was introduced in the form of sodium bisulfite, the concentration of which constantly decreased in the solution during the process, thus causing a decrease in acidity. This was also the case in the prior art process in which the content of alkali sulfite in the reaction mixture following the reaction, was maintained as low as possible, for example, less than 45 grams, alkali sulfite per liter. This final condition was obtained by maintaining the alkali bisulfite content of the initial solution within restricted limits. But since the production of hyposulfite in such process, as well as in the other prior art processes, took place only insofar as the sodium bisulfite was originally present in the solution, the starting solution because of the high concentration of sodium bisulfite possessed a necessarily higher acidity, not less than pH=4-5. If one attempts, however, to undertake the direct combination of sodium with sulphur dioxide in this range of acidity, while regulating the introduction of the sulphur dioxide so that the acidity of the initial solution is maintained substantially constant, the sodium hyposulfite formed is decomposed to such an extent that the yield of hyposulfite is entirely unsatisfactory.

Instead of the named addition substances, other salts of weak or moderately strong acids may be utilized which are able to impart to the solution an acidity represented by a pH of between 6 and 7. The reaction can be carried out at ordinary or elevated temperatures, or desirably at low temperatures. Further the process can be carried out to cause separation of a hyposulfite as either the dihydrate or as the water-free salt, or the separation of the hyposulfite may be promoted by the addition of sodium chloride or similarly acting salts.

The soluble salts which are added act only as protecting materials and are recovered unchanged from the reaction. They are not used up in the reaction.

Desirably the metallic sodium is utilized in the form of sodium amalgam obtained electrolytically. The yield of hyposulfite is above 90% based on the metallic sodium introduced into the process.

The following illustrates the carrying out of the invention in a desirable apparatus and on a technical scale.

There is a reaction vessel, as shown in the drawing in schematic form, a cooling bath L in which is the glass flask A, having a double holed floor or bottom B. Through one of these openings in the floor, the concentrated amalgam is introduced into the vessel A from the burette C, while the diluted amalgam is withdrawn in a regular manner from the overflow D, desirably in the form of a goose neck, and communicating with the reaction vessel through the other opening of the floor or bottom B in the flask A. A suitable layer of mercury is shown at E in the bottom of the flask A, while above the mercury is the buffer salt solution G. Assuming a reaction vessel A of 13 cm. width, the mercury layer may be approximately 3 cm. in height and 1 L. of buffer salt solution may be employed. As exemplary of such buffer salt solution, there may be utilized a solution of the composition of 30 grams per liter of potassium bisulfite and 35 grams per liter of dipotassium hydrogen phosphate, having a pH value of 6.6.

Through the multi-hole stopper of the flask, there are provided the tube H by means of which the sulphur dioxide is led into the gas space of the reaction flask A above the aqueous phase or liquid, the tube K which serves for the purpose of removing samples for analysis or testing, the tube I with the attached water seal for equalization of the pressure, and the stirrer F.

As particularly shown in Figure 2 of the drawing, the stirrer is provided with an arm P which serves to cause rotation of the mercury and its intermixture with the concentrated amalgam introduced from the burette C. The stirrer arms O which dip slightly into the mercury, by repeated stripping off of the surface of the amalgam, serve to produce an intensive renewal of the diffusion layer between the mercury and aqueous phases.

After the apparatus has been provided with an inert atmosphere, there is run into it with agitation and cooling, an amalgam having for example a content of 0.26% sodium (corresponding with 35 grams sodium per liter) with a velocity of, for example 10 ccm. per minute (corresponding with 0.35 grams sodium per minute), and simultaneously sulphur dioxide is fed in through the tube H in the equivalent ratio represented by $Na_2:2SO_2$, which under the conditions given above is approximately 0.95 gram sulphur dioxide per minute. During the course of the reaction, the introduction of the sulphur dioxide is regulated in order to control the acidity of the solution, which should remain approximately constant. The temperature during the reaction is desirably kept under 20° C. by cooling, and preferably is maintained at approximately 10 to 14° C. The excess mercury is removed from the overflow D as a quite dilute amalgam with a content of less than 1 gram of sodium per liter.

When the reaction solution has gradually reached saturation with hyposulfite (in some cases higher than the saturation point), it is removed from the reaction vessel, and worked up in the ordinary way, as by salting out or other methods for the recovery of the solid salt. The yield of hyposulfite based on the amount of sodium introduced into the process will vary from 88 to 96%, dependent upon the conditions of agitation or stirring, cooling, and the velocity of introduction of the sodium amalgam.

In carrying out the reaction on a larger scale, the reaction vessel may, for example, take the form of a shallow, round trough having a cement or similar lining. The floor of the trough is provided with one or more openings through which the concentrated amalgam is introduced from the electrolytic cells. The reaction trough is made air-tight by means of a cover provided with openings for the introduction of the sulphur dioxide, for the removal of air, for the taking of samples, for the measurement of temperature, for solution overflow, and for the stirrer. The cooling of the reaction liquid in such cases can take place within the reaction vessel, or in a cooling coil outside thereof. The mercury which flows through the apparatus after removal of its sodium content finally flows out either through an opening in the floor, or through an overflow similar to that in the reaction apparatus described above, and is returned to the electrolytic cells.

Such apparatus can be operated in a manner analogous to that described above in connection with the apparatus shown in the drawing, in that the trough is provided with a layer of mercury which extends over the entire floor of the trough, and is covered with a buffer salt solution of the composition given above, for example, after which the amalgam and sulphur dioxide are introduced in the relation of $Na_2:2SO_2$ with stirring and cooling; the reaction liquid is gradually enriched with hyposulfite until saturated and finally worked up outside of the trough into the solid salt. The yield is above 90%.

In order to operate the process continuously, the buffer salt solution is continuously introduced into the reaction vessel, and at the same time the saturated or super-saturated hyposulfite solution is constantly withdrawn through the solution overflow of the reaction vessel or trough into a separate vessel, where it is worked up to produce the solid salt as by salting out or similar operation. This method of operation has the disadvantage that the reaction vessel always contains a solution of higher hyposulfite concentration, which naturally is more amenable to decomposition; and as a result the yields are smaller than in the examples given above. In order to avoid this disadvantage, the continuous process may more desirably be carried out in a series of reaction vessels instead of in a single reaction vessel, and in such series of interconnected reaction vessels or troughs, the solution drawn off from one trough or reaction vessel is led into the next succeeding one. By this arrangement, there is a stepwise enrichment of the inflowing first solution, so that only the last of the series of reaction vessels or troughs contains the high concentration of hyposulfite solution; and in this way yields of approximately 90% are again obtained.

Besides in order to avoid the difficulty of decomposition of the solution, there may desirably be added to the buffer salt solution with which the reaction vessel is provided, an addition of the material for salting out the hyposulfite, for example ordinary salt, so that the solubility of the hyposulfite is materially reduced. If, for example, there is utilized an ordinary salt solution (sodium chloride) containing about 200 grams per liter of sodium chloride, and buffered with 20 grams per liter of phosphoric acid and 17 grams per liter of caustic potash, and having an acidity represented by approximately pH=6, there can be formed in the reaction vessel or trough a hyposulfite solution which is saturated, although only containing from 50 to 60 grams per liter of $Na_2S_2O_4$. Desirably in such cases, however, the process is carried out utilizing super-saturated solutions which contain approximately from 10 to 30 grams per liter of solid hyposulfite suspended therein. The reaction liquid constantly removed through the solution overflow of the reaction vessel or trough is led into a collection vessel where the suspended sodium hyposulfite and a portion of the dissolved sodium hyposulfite is separated by means of strong cooling, and removed by filtration. The resulting liquor is then returned to the reaction vessel or trough. In such methods of operation, excellent yields of approximately 90% are obtained.

The buffer salts may be suitable salts of polybasic acids including those of the alkali metals, such as sodium and potassium, and ammonium salts.

Having thus set forth our invention, we claim:

1. The method of producing hyposulfites which comprises directly reacting an alkali metal and sulphur dioxide in an aqueous medium having an acidity maintained between a pH of between 6 and 7.

2. The method of producing hyposulphites which comprises directly reacting metallic sodium and sulphur dioxide in the ratio of $Na_2:2SO_2$ in an aqueous medium in the presence of an acid salt of an acid selected from the group consisting of weak and moderately strong polybasic acids, the relative quantities of sulphur dioxide and salt being such as to maintain an acidity in the aqueous medium represented by a pH of between 6 and 7.

3. The method of producing hyposulfites which comprises directly reacting an alkali metal and sulphur dioxide in an aqueous medium in the presence of a buffer acid salt of an acid selected from the group consisting of weak and moderately strong polybasic acids, the relative quantities of sulphur dioxide and salt being such as to maintain an acidity in the aqueous medium represented by a pH of between 6 and 7.

4. A process as set forth in claim 1 wherein the temperature is below 20° C.

5. The method producing hyposulfites which comprises directly reacting metallic sodium and sulphur dioxide in the presence of an aqueous solution of a salt of an acid selected from the group consisting of weak and moderately strong acids, the quantity of such salts being such as to produce an acidity in the solution represented by a pH of between 6 and 7, and regulating the introduction of sulphur dioxide so that the acidity of the solution is maintained between those limits.

6. A process as set forth in claim 5 in which the aqueous solution also contains a neutral salt of the stated acids for buffering the process.

7. The method of producing hyposulfites which comprises contacting metallic sodium with an aqueous solution of a neutral salt and introducing sulphur dioxide in an amount sufficient to maintain the solution at an acidity represented by a pH of between 6 and 7.

8. The method of producing hyposulfites which comprises continuously contacting an alkali metal amalgam with an aqueous liquid, while continuously introducing sulphur dioxide to the reaction mass for reaction with the alkali metal of the amalgam in the ratio of $Na_2:2SO_2$, and maintaining the acidity of the liquid between a pH of 6 and 7.

9. The method of producing hyposulfites which comprises continuously contacting a sodium amalgam with an aqueous solution of an acid salt of an acid selected from the group consisting of weak and moderately strong acids while continuously introducing sulphur dioxide to the reaction mass for reaction with the sodium of the amalgam, the relative quantities of sulphur dioxide and salt being such as to maintain an acidity in the aqueous medium represented by a pH of between 6 and 7.

10. The method of producing hyposulfites which comprises maintaining a series of reaction zones each containing a layer of mercury, superposing an aqueous solution of an acid salt of an acid selected from the group consisting of weak and moderately strong acids, said solution having a pH maintained between 6 and 7, on the mercury layer of the first reaction zone, introducing an alkali metal amalgam into the mercury layer and sulphur dioxide to the aqueous solution, and agitating the mercury layer and aqueous solution in the first reaction zone to cause reaction between the sulphur dioxide and alkali metal to produce an aqueous solution of hyposulfite of the alkali metal, transferring the aqueous solution of hyposulfite from the first reaction zone into the second reaction zone into contact with the mercury layer therein, introducing an alkali metal amalgam into the mercury layer of the second zone and sulphur dioxide to the aqueous liquid of the second zone, and agitating the mercury layer and aqueous liquid in the second zone to cause reaction between the sulphur dioxide and alkali metal to produce hyposulfites of the alkali metal in the said aqueous solution of hyposulfites, and repeating the reaction in successive zones by utilizing the aqueous solution of hyposulfites obtained from a preceding reaction zone as the aqueous liquid in a successive reaction zone, until the solution becomes at least saturated with hyposulfites, withdrawing such solution and recovering hyposulfites therefrom.

WERNER MECKLENBURG.
ALFRED WURBS.